(12) United States Patent
Schneider et al.

(10) Patent No.: US 11,903,780 B2
(45) Date of Patent: Feb. 20, 2024

(54) METHOD FOR DESIGNING A DENTAL COMPONENT

(71) Applicant: DENTSPLY SIRONA INC., York, PA (US)

(72) Inventors: Sascha Schneider, Mühlta (DE); Frank Thiel, Ober-Ramstadt (DE)

(73) Assignee: DENTSPLY SIRONA INC., York, PA (US)

( * ) Notice: Subject to any disclaimer, the term of this patent is extended or adjusted under 35 U.S.C. 154(b) by 573 days.

(21) Appl. No.: 17/251,345

(22) PCT Filed: Jun. 17, 2019

(86) PCT No.: PCT/EP2019/065849
§ 371 (c)(1),
(2) Date: Dec. 11, 2020

(87) PCT Pub. No.: WO2019/243241
PCT Pub. Date: Dec. 26, 2019

(65) Prior Publication Data
US 2021/0251729 A1 Aug. 19, 2021

(30) Foreign Application Priority Data
Jun. 22, 2018 (DE) .......................... 102018210258.9

(51) Int. Cl.
*A61C 13/00* (2006.01)
*G06T 7/00* (2017.01)
(Continued)

(52) U.S. Cl.
CPC ........ *A61C 13/0004* (2013.01); *A61C 9/0053* (2013.01); *A61C 19/10* (2013.01);
(Continued)

(58) Field of Classification Search
CPC ... A61C 13/0004; A61C 9/0053; A61C 19/10; G06T 7/0012; G06T 17/00
See application file for complete search history.

(56) References Cited

U.S. PATENT DOCUMENTS 6,319,006 B1 11/2001 Scherer
2014/0277665 A1* 9/2014 Fisker ..................... G06F 30/00
700/98

(Continued)

FOREIGN PATENT DOCUMENTS

| CN | 107440811 A | 12/2017 |
|---|---|---|
| DE | 112014003898 T5 | 6/2016 |

(Continued)

OTHER PUBLICATIONS

Wikipedia Article: "Convolutional Neural Network"; https://de.wikipedia.org/wiki/Convolutional Neural Network.

(Continued)

*Primary Examiner* — Christopher M Brandt
(74) *Attorney, Agent, or Firm* — DENTSPLY SIRONA INC.

(57) ABSTRACT

A method for designing a dental component, specifically a restoration, a bite guard or an impression tray, comprising the steps of: measuring a dental situation; generating a 3D model of the dental situation; applying an artificial neural network for machine learning (convolutional neural network; CNN) to the 3D model of the dental situation and/or an initial 3D model of the dental component, and automatically generating a fully designed 3D model of the dental component, specifically the restoration, the bite guard or the impression tray.

14 Claims, 2 Drawing Sheets

(51) Int. Cl.
  *A61C 9/00* (2006.01)
  *A61C 19/10* (2006.01)
  *G06T 17/00* (2006.01)
(52) U.S. Cl.
  CPC .......... *G06T 7/0012* (2013.01); *G06T 17/00* (2013.01); *G06T 2207/20084* (2013.01); *G06T 2207/30036* (2013.01)

(56) References Cited

U.S. PATENT DOCUMENTS

2018/0028294 A1    2/2018  Azernikov
2019/0282344 A1*   9/2019  Azernikov ......... A61C 13/0004

FOREIGN PATENT DOCUMENTS

| EP | 3432312 A1 | 1/2019 |
| WO | 2018158411 A1 | 9/2018 |
| WO | 2018175486 A1 | 9/2018 |
| WO | 2018195554 A1 | 10/2018 |

OTHER PUBLICATIONS

International Search Report; PCT/EP2019/065849; Sep. 12, 2019 (completed); dated Sep. 26, 2019 (dated).
International Preliminary Report on Patentability; PCT/EP2019/065849; Sep. 12, 2019 (completed); dated Sep. 26, 2019 (dated).
Written Opinion of the International Searching Authority; PCT/EP2019/065849; Sep. 12, 2019 (completed); dated Sep. 26, 2019 (dated).
Chinese Office Action dated Jul. 1, 2021.

* cited by examiner

METHOD FOR DESIGNING A DENTAL COMPONENT

TECHNICAL FIELD

The invention relates to a method for designing a dental component, specifically a restoration, a bite guard or an impression tray, wherein a dental camera or laboratory scanner is used to measure a dental situation and generate a 3D model of the dental situation.

BACKGROUND OF THE INVENTION

Several methods for designing dental components are known from the prior art.

DE 11 2014 003 898 T5 discloses a computer-implemented method for designing tooth restorations, wherein a preparation margin is defined on a virtual three-dimensional representation, an arch shape of a virtual tooth library is positioned and an initial restoration is proposed on the basis of a tooth design obtained from the virtual tooth library.

A disadvantage of this method is that the restoration is proposed on the basis of a virtual tooth library, which means that fitting irregularities in the restoration for the relevant dental situation can occur. This means that a virtual post-processing of the proposed 3D model of the restoration is necessary.

The present invention therefore addresses the problem of providing a method for designing a dental component that proposes a suitable 3D model of the dental component in a time-saving manner.

SUMMARY OF THE INVENTION

The invention relates to a method for designing a dental component, specifically a restoration, a bite guard or an impression tray, wherein a dental situation is measured, for example, by means of a dental camera or a laboratory scanner and a 3D model of the dental situation is generated. An artificial neural network for machine learning (convolutional neural network; CNN) is applied to the 3D model of the dental situation or the initial 3D model of the component and a fully designed 3D model of the component, specifically the restoration, the bite guard or the impression tray is automatically generated.

The component can therefore be a restoration, a bite guard or an impression tray, which can be produced, for example, by means of a CAD/CAM process.

The dental camera can be any three-dimensional dental camera that is based, for example, a fringe projection method or a confocal measurement method.

The dental situation can include the immediate environment of the restoration to be inserted or also a larger region around the restoration to be inserted. The measurement by means of the dental camera can take place from different directions, such as an occlusal direction, a lingual direction, a buccal direction or a labial direction.

After the measurement using the dental camera, the 3D model of the dental situation is generated. Then the neural network for machine learning is applied to the 3D model of the dental situation. After analysis of the 3D model of the dental situation, a 3D model of the component is then automatically generated.

An artificial machine learning neural network (CNN) is a computer algorithm that enables automatic detection of the restoration type.

A neural network (CNN) is described in detail in the Wikipedia article "Convolutional Neural Network" with the link https://de.wikipedia.org/wiki/Convolutional Neural Network.

The following explains a method using a CNN.

A convolutional neural network (CNN) is a feed-forward artificial neural network. It is a concept inspired by biological processes in the field of machine learning. Convolutional neural networks are used in numerous modern artificial intelligence technologies, primarily in the machine processing of image or audio data.

Basically, the structure of a classic CNN consists of a convolutional layer, followed by a pooling layer. In principle, this unit can be repeated any number of times. If it is repeated enough, one speaks of deep convolutional neural networks, which fall into the field of deep learning.

The CNN learn by learning free parameters or classifiers of the convolution kernel per layer and their weighting when calculating the next layer.

The 3D model of the dental situation is thus used as input to the CNN or machine learning system which was trained using a collection of a large number of 3D models of different dental situations.

In a further step, the 3D model of the dental situation is analyzed using the machine learning system and a 3D model of the relevant component is proposed as output.

The machine learning system can consist of one or more CNN networks.

Color information of the dental situation can also be used as input for the CNN network. The color information is then assigned to the surface points of the 3D model of the dental situation.

The classifiers or features are therefore automatically determined and refined during the analysis of the training set. The automatically determined classifiers of a 3D model of a dental situation could, for example, be a total area of a preparation or the course of the preparation edge or a combination of both.

The CNN network can, for example, consist of a plurality layers with simple classifiers such as edges, flat surfaces or regions of equal brightness being automatically identified in a first layer. In a second layer, the classifiers are automatically refined. The classifiers in the second layer can be, for example, the relative arrangement of the edges to one another, the relative direction of the edges or the course of the edges. In further layers, the classifiers are refined more and more, therefore becoming more and more complex. In this way, the CNN network learns to use the 3D model of the dental situation as input parameters to automatically generate a suitable 3D model of the component.

The restoration can be, for example, an inlay, a crown, a bridge, an abutment, a pontic or a veneer.

The crown can be, for example, a full crown or a partial crown. An implant-supported full crown is connected to an abutment, the inner surface of the full crown having an adhesive surface for the abutment.

The bridge can be attached to the jawbone using implants and abutments, for example, or attached to the stumps of adjacent healthy teeth. The bridge can be fixed or removable. The bridge can also be a base bridge, which consists of a base made of a metal alloy and a structure made of ceramic or a plastic.

An abutment is a support post that is used as a connecting piece between a dental implant and a restoration, such as a dental crown. An abutment can be detachably or permanently attached to the implant. Implant abutments can be classified according to the type of manufacture. A distinction is made between prefabricated, cast-on or press-fit abutments and CAD/CAM implant abutments. Prefabricated abutments are provided in various sizes, shapes and angled portions that can or cannot be ground. One-piece implants have integrated abutments. The abutments produced using a CAD/CAM process can be individually adapted to the given dental situation both in terms of the axial tilt and in terms of shape. Tooth-colored abutments are used in aesthetic restorations, especially in the anterior region, so that the visual impression of a natural tooth is imitated as far as possible. Abutments are usually made of titanium or a ceramic.

A veneer is a covering made of a thin, translucent ceramic shell, especially for the front teeth.

An inlay is a filling insert that is used in the preparation of a tooth. In contrast to plastic filling material, which is brought into the tooth in a soft consistency using shaping aids and then hardens, the inlay is a precisely fitting workpiece that is adhesively bonded into the preparation of the tooth.

A pontic is a unit of a bridge.

The bite guard can be, for example, a guided bite guard or a non-guided bite guard.

A guided bite guard is used in the dental and orthodontic treatment of teeth grinding and craniomandibular dysfunction.

A guided bite guard can be, for example, a Michigan splint that is used to avoid muscle and joint pain as well as an unsafe final bite position. The Michigan splint works primarily as a relaxation splint. The lower jaw is usually guided on the bite guard in the canine region.

The guided bite guard thus serves as a relaxation splint to prevent occlusal malfunctions and to relax the masticatory muscles (reduction in muscle tone).

The guided bite guard is also intended to protect against the destruction of the hard tooth substance, which is caused by teeth grinding.

The guiding of the bite guard is mostly provided in the anterior region and/or in the canine region and can have a certain angle of inclination relative to an insertion axis of the bite guard of between 20 and 40 degrees.

A guided bite guard cart be used to treat various malocclusion positions, such as a malocclusion with a lower jaw that is lying back or a malocclusion with a protruding lower jaw. Jaw abnormalities can either, be congenital or acquired. The extent of the malocclusion only becomes clear when the jaw closes, and is shown, for example, by an open bite or by, the upper jaw teeth biting behind the lower jaw teeth instead of the other way around. The position of the jaws in relation to each other and in relation to the skull has a crucial influence on a facial profile. Depending on whether the overdevelopment or underdevelopment is located in the upper jaw and/or in the lower jaw, different facial profiles result in tandem with the malocclusion.

The impression tray can be an individual impression tray that is adapted to the relevant patient according to the 3D model of the dental situation. An impression tray is used to make an impression of a dentulous or an edentulous jaw.

The advantage of a CNN network is that the parameter values of the internal convolution filter and the further processing of the filter outputs are learned during the analysis of the training set and therefore no further user specification is necessary.

Another advantage of the method is that the component is designed fully automatically using the CNN network. As a result, the component can be designed fully automatically immediately after the optical measurement and, after a check by the dentist, can be produced fully automatically using a CAD/CAM device so that the component can be used within one session.

Another advantage of the method is that fully designed components generated by the user are used in the training data set of the CNN, thus improving the acceptance rate of the initial suggestions for the components and the degree of automation of the design.

A possible method for training or setting the parameters of the machine learning system consisting of one or more CNN networks is explained below. In the first step, a large number of known 3D models of dental situations are analyzed. Possible input data are generated. The input data are generated in such a way that all possible degrees of freedom are available in the input data. This is achieved using data augmentation. For this purpose, the 3D models of the dental situations are rotated by the specified degrees of freedom and/or scaled along the degrees of freedom.

The individual CNN networks are then applied to the individual 3D data of the individual 3D models of the dental situations in order to train the CNN networks.

The neural network can advantageously be trained on the basis of a training data set, the training data set including initial 3D models of components and manual changes to these initial 3D models of at least one user. The manual changes can be carried out manually by the user using CAD tools in designing the 3D model of the relevant component.

In this way, the CNN network learns to apply the manual changes made by a specific user to an initial proposal for a 3D model of a component in order to complete the design of the component. The initial proposal of a 3D model of the component can be selected, for example, using a library of a plurality of 3D models of components. When the CNN network trained in this way is applied to an unknown 3D model of a dental situation, changes to the initial proposal that are usual for the relevant user are then automatically carried out. The manual changes to the initial 3D model of the component can be, for example, in the case of an implant-supported full crown, the adjustment of the outer dimensions of the full crown to the neighboring teeth and the opposing teeth by fissure changes and/or cusp changes, an adjustment of the inner surface to the abutment used and/or an adjustment of a gingival margin. In the case of a bite guard, manual changes can be smoothing by removing local cusps, and, in the case of an impression tray, a shortening of the length of the impression tray.

The neural network can advantageously be trained on the basis of a training data set, the training data set including initial 3D models of components and the corresponding 3D models of the fully designed components of at least one user.

As a result, the CNN network learns from the comparison data between an initial 3D model and a fully designed 3D model of a component.

The neural network can advantageously be trained on the basis of a training data set, with the training data set including a plurality of 3D models of the dental situations and the corresponding 3D models of the fully designed components of at least one user.

As a result, the CNN network can be trained using a training data set from different users. The users for the training data set can be selected according to various criteria, such as professional experience. For the training data set, for example, only data from users who have at least three years of professional experience or who have carried out at least 100 cases in the design of the relevant component can be used.

In this embodiment, the training data set therefore only contains the 3D models of the dental situations and the corresponding fully designed 3D models of the components. The CNN network learns to use the training data set for a 3D model of the dental situation to generate a suitable 3D model of the relevant component. The user can specify beforehand the type of component and the position of the component to be inserted.

There is therefore a separate training data set for each type of component for each user.

The training data set can advantageously only contain the data of one user or of a group of experienced users.

This improves the quality of the training data set and thus of the trained CNN network.

The neural network can advantageously remain unchanged after training on the basis of the training data set or new data can be added to the training data set so that the neural network can be trained further on the basis of the expanded training data set.

Especially for inexperienced users, it is advantageous not to change a trained CNN network initially. For experienced users, it is more advantageous to add their own data with respect to the design of a component to a training data set so that the CNN network is continuously trained and better meets the needs of the relevant user over time. Further training data are therefore added to the expanded training data set.

The component can advantageously be the restoration, with the restoration being an inlay, a crown, a crown framework, a bridge, a bridge framework, an abutment, a pontic or a veneer.

The user can, for example, manually select the type of restoration and roughly define the position of the restoration to be inserted. The CNN network trained with the relevant training data set then generates the 3D model of the relevant restoration based on the 3D model of the dental situation.

The 3D model of the dental situation can advantageously comprise at least one tooth for inserting the restoration, at least one preparation, a residual tooth, at least one neighboring tooth, an abutment for inserting the restoration to be produced, color information of the dental situation and/or a color gradient of the dental situation.

The 3D model of the relevant component is therefore automatically designed by the CNN network according to the structures contained in the 3D model of the dental situation. The color gradient and the color information of the dental situation can also be used to automatically design the color of a full crown, for example.

The neural network can advantageously use color information and/or a color gradient of the 3D model of the dental situation, specifically the residual tooth and/or at least one neighboring tooth, in order to automatically determine a color and/or a color gradient for the restoration to be inserted.

This means that the color gradient of the restoration to be inserted is automatically determined using the CNN network.

Advantageously, the neural network can automatically specify a material, a production method, an insertion method, a tapping position and/or a contact tightness with respect to the neighboring teeth for the restoration to be produced.

The suitable material can be, for example, ceramic, metal or a plastic. For example, a suitable blank made of a ceramic material can be selected for automatic production by means of a CAM production device. The production method can also be the manufacture of the component using a 3D printer.

The insertion method can be, for example, adhesion, screwing in, or cementing.

The tapping position is the position of a bar between a restoration produced and the holder of a blank after the restoration has been milled out using a CAM manufacturing device.

In the case of bridges, for example, the contact tightness with respect to the neighboring teeth describes the area of contact between two neighboring teeth of the bridge.

Advantageously, the training data set can additionally include a color, a color gradient, a material, a production method, an insertion method, a tapping position and/or a contact tightness with respect to the neighboring teeth of the fully designed restoration.

As a result, the training data set contains further essential information about the component so that the trained CNN network can design a suitable component that meets the requirements of the relevant user.

Advantageously, the component may be the bite guard or the impression tray, wherein the 3D model of the dental situation has teeth for placing the splint and the impression tray.

As a result, the training data set contains the teeth for placing the bite guard or the impression tray.

The neural network can advantageously automatically specify a material and/or a production method for the bite guard or impression tray to be produced.

This reduces the design period.

The neural network can advantageously take into account an ethnic group and/or a character type of the patient.

Characteristic anatomical features of an ethnic group can thereby be taken into account in the design of the relevant component. The characteristic features of an ethnic group can be, for example, the characteristic position of the teeth or a certain pigmentation of the gums or teeth.

BRIEF DESCRIPTION OF THE DRAWINGS

The invention is explained with reference to the drawings. The following is shown.

DETAILED DESCRIPTION OF THE INVENTION

Figure 1:
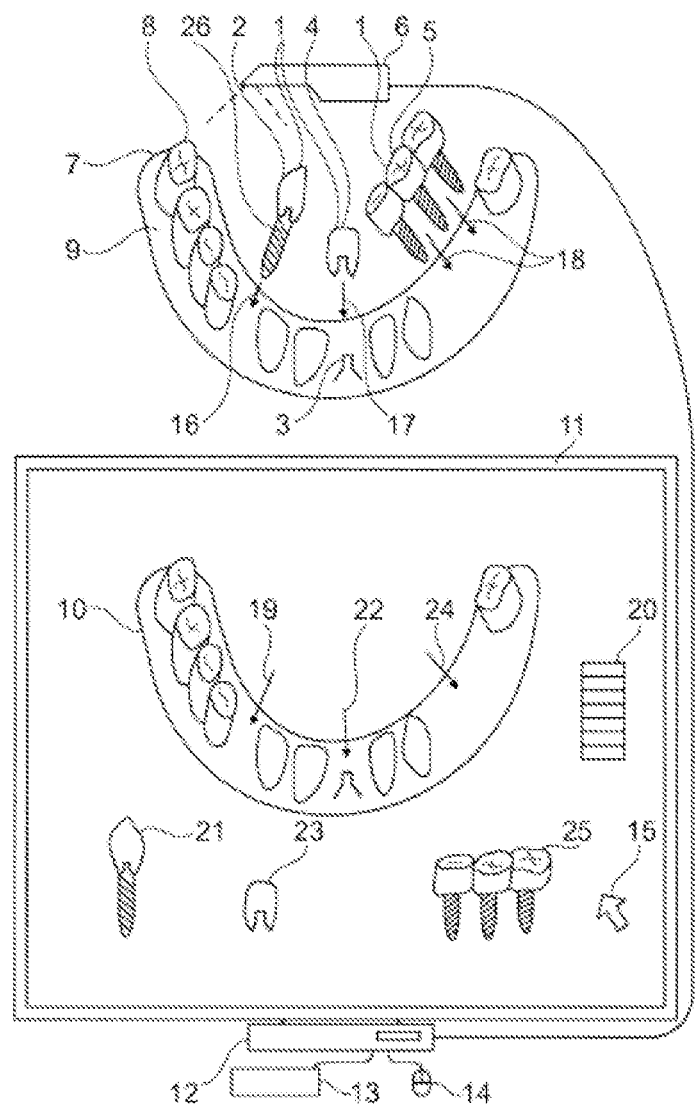
FIG. 1 shows a drawing to illustrate the method for designing a component.

FIG. 1 shows a drawing to illustrate the method for designing a component 1, such as an implant-supported kill crown 2, a full crown 4 supported by a preparation 3 or an implant supported bridge 5. The component 1 can also be a bite guard or an impression tray. A dental camera 6 is used to measure a dental situation 7, including teeth 8 and gums 9, and a 3D model 10 of the dental situation 7 is calculated from the image data, which 3D model can be displayed by means of a display device 11 such as a monitor. The display device 11 is connected to a computer 12, with an input device such, as a keyboard 13 or a mouse 14 being connected to the computer 12 and enabling the user to navigate by means of a cursor 15 within a graphic representation of the 3D model 10. The dental situation 7 has a missing canine tooth, an incisor with a preparation 3 and three missing molars of the lower jaw. An implant-supported full crown 2 should replace the canine tooth, the full crown 4 should be placed on the preparation 3, and the bridge 5 to be designed should replace the three missing molars, as indicated by arrows 16, 17 and 18. In a first step, the user can manually use the cursor 15 to specify a first position of a first component to be designed and inserted, specifically an implant-supported crown 2, and select the type of component, specifically an implant-supported crown, in a selection menu 20. In a second step, a 3D model 21 of the component, specifically the implant-supported full crown 2, is automatically generated by means of a neural CNN network which has been trained on the basis of a training data set for the relevant user and the relevant type of component. Accordingly, the position 22 of the full crown 4 is specified manually and the type of component 1, specifically a full crown supported by a preparation, is selected in the selection menu 20. A second 3D model 23 of the full crown 4 is then generated by means of the corresponding CNN network. The position 24 of the bridge 5 to be inserted is then specified, and the type of component 1 is selected from the selection menu 20. In a further step, a 3D model 25 of the bridge 5 is automatically generated by means of a CNN network for implant-supported bridges and the relevant user. The designed components 2, 4 and 5 can then be produced, for example, automatically from blanks by means of a CAM production device, not shown, using the designed 3D models 21, 23 and 25.

Figure 2:
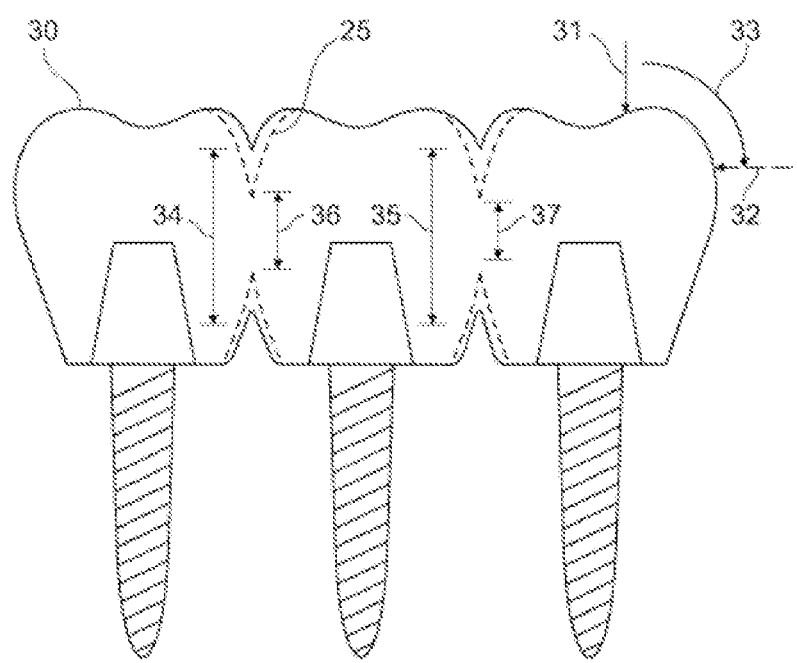
FIG. 2 shows a drawing of an initial 3D model.

FIG. 2 shows a drawing of an initial 3D model 30 of the bridge 5 from FIG. 1, wherein the user manually adapts the initial 3D model 30 using CAD tools in order to generate the adjusted 3D model 25 shown in dashed lines, a tapping position 31 is shifted to a tapping position 32 shown in dashed lines, as indicated by the arrow 33, and a contact tightness 34 and 35 of the initial 3D model 30 is reduced to a contact tightness 36 and 37 of the adapted 3D model 25. A large number of such manual changes or adjustments to an initial 3D model 30 for the relevant user and for the relevant type of components, specifically implant-supported bridges, can then be combined in a training data set in order to train an associated CNN network. This trained CNN network, which runs as a program on the computer 12, can then be used to automatically implement the changes or adjustments on the basis of an initial 3D model 30.

REFERENCE SYMBOLS

1 Component
2 Implant-supported full crown
3 Preparation
4 Full crown
5 Implant-supported bridge
6 Camera
7 Dental situation
8 Teeth
9 Gum
10 3D model
11 Display device
12 Computer
13 Keyboard
14 Mouse
15 Cursor
16 Arrow
17 Arrow
18 Arrow
19 Position of the implant-supported full crown
20 Selection menu
21 3D model the implant-supported full crown
22 Position of the full crown
23 3D model of the full crown
24 Position of the bridge
25 3D model of the bridge
26 Implant
30 Initial 3D model
31 Tapping position
32 Tapping position
33 Arrow
34 Contact tightness
35 Contact tightness
36 Contact tightness
37 Contact tightness

The invention claimed is:

1. A method for designing a dental component, comprising the steps of:
   measuring a dental situation;
   generating a 3D model of the dental situation;
   applying an artificial neural network for machine learning (convolutional neural network; CNN) to the 3D model of the dental situation and/or an initial 3D model of the dental component, and
   automatically generating a fully designed 3D model of the dental component;
   wherein the neural network is trained on the basis of a training dataset;
   wherein new data is added to the training data set to further train the neural network on the basis of the expanded training data set.

2. The method according to claim 1, wherein the neural network is trained on the basis of a training data set, wherein the training data set includes initial 3D models of initial dental components and manual changes of these initial 3D models during the design of the 3D model of at least one user.

3. The method according to claim 1, wherein the neural network is trained on the basis of a training data set, wherein the training data set includes a plurality of 3D models of a plurality of dental situations and the corresponding 3D models of fully designed initial dental components of at least one user.

4. The method according to claim 2, wherein the training data set only contains the data of one user or of a group of experienced users.

5. The method according to claim 2, wherein the neural network remains unchanged after training on the basis of the training data set.

6. The method according to claim 1, wherein the dental component is the restoration, wherein the restoration is an inlay, a crown, a crown framework, a bridge, a bridge framework, an abutment, a pontic or a veneer.

7. The method according to claim 6, wherein the 3D model of the dental situation has at least one tooth for inserting the dental component, at least one preparation, one residual tooth, at least one neighboring tooth, an abutment for inserting the dental component to be produced, color information of the dental situation and/or a color gradient of the dental situation.

8. The method according to claim 7, wherein the neural network uses color information and a color gradient of the 3D model of the dental situation, specifically the residual tooth and/or at least one neighboring tooth, to automatically specify a color and/or a color gradient for the restoration to be inserted.

9. The method according to claim 6, wherein the neural network automatically specifies a material, a production method, an insertion method, a tapping position and a contact tightness with respect to the neighboring teeth for the dental component to be produced.

10. The method according to claim 6, wherein the training data set additionally includes a color, a color gradient, a material, a production method, an insertion method, a tapping position and/or a contact tightness with respect to the neighboring teeth of the fully designed dental component.

11. The method according to claim 1, wherein the dental component is a bite guard or an impression tray, wherein the 3D model of the dental situation comprises the teeth for placing the bite guard or the impression tray.

12. The method according to claim 11, wherein the neural network automatically specifies a material and/or a production method for the bite guard or the impression tray to be produced.

13. A device comprising a processor configured to:
   measure a dental situation;
   generate a 3D model of the dental situation;
   apply an artificial neural network for machine learning (convolutional neural network; CNN) to the 3D model of the dental situation and/or an initial 3D model of the dental component, and
   automatically generate a fully designed 3D model of the dental component;
   wherein the neural network is trained on the basis of a training dataset;
   wherein new data is added to the training data set to further train the neural network on the basis of the expanded training data set.

14. A non-transitory computer-readable storage medium comprising commands which, when executed by a computer, cause the computer to:
   measure a dental situation;
   generate a 3D model of the dental situation;
   apply an artificial neural network for machine learning (convolutional neural network; CNN) to the 3D model of the dental situation and/or an initial 3D model of the dental component, and
   automatically generate a fully designed 3D model of the dental component;
   wherein the neural network is trained on the basis of a training dataset;
   wherein new data is added to the training data set to further train the neural network on the basis of the expanded training data set.

* * * * *